(12) United States Patent
Magni (10) Patent No.: US 12,297,090 B2
(45) Date of Patent: May 13, 2025

(54) ROTARY TELESCOPIC BOOM LIFT

(71) Applicant: MAGNI REAL ESTATE S.R.L., Castelfranco Emilia (IT)

(72) Inventor: Riccardo Magni, Modena (IT)

(73) Assignee: MAGNI REAL ESTATE S.R.L., Castelfranco Emilia (IT)

( * ) Notice: Subject to any disclaimer, the term of this patent is extended or adjusted under 35 U.S.C. 154(b) by 105 days.

(21) Appl. No.: 18/030,185

(22) PCT Filed: Jun. 24, 2021

(86) PCT No.: PCT/EP2021/067403
§ 371 (c)(1),
(2) Date: Apr. 4, 2023

(87) PCT Pub. No.: WO2022/073659
PCT Pub. Date: Apr. 14, 2022

(65) Prior Publication Data
US 2023/0365387 A1 Nov. 16, 2023

(30) Foreign Application Priority Data
Oct. 5, 2020 (IT) .................. 102020000023365

(51) Int. Cl.
*B66F 9/24* (2006.01)
*B60L 1/00* (2006.01)
(Continued)

(52) U.S. Cl.
CPC .................. *B66F 9/24* (2013.01); *B60L 1/00* (2013.01); *B60L 50/61* (2019.02); *B60L 50/66* (2019.02);
(Continued)

(58) Field of Classification Search
None
See application file for complete search history.

(56) References Cited

U.S. PATENT DOCUMENTS

2012/0160796 A1* 6/2012 Weckbecker ............ B66D 1/22
254/342

FOREIGN PATENT DOCUMENTS

| EP | 3599213 A1 | 1/2020 | |
|---|---|---|---|
| JP | 2006136119 A | 5/2006 | |
| WO | WO-2015053618 A1 * | 4/2015 | ............. B60K 25/02 |

OTHER PUBLICATIONS

International Search Report dated Oct. 1, 2021 issued in PCT/EP2021/067403.

(Continued)

*Primary Examiner* — Jared Fureman
*Assistant Examiner* — Aqeel H Bukhari
(74) *Attorney, Agent, or Firm* — Scully, Scott, Murphy & Presser, P.C.

(57) ABSTRACT

A rotary telescopic boom lift, which comprises at least one self-propelled machine, which can move over ground and supports in an upper region a rotating assembly, associated with the machine by way of a rotary coupling element. The assembly comprises at least one turret and an operating boom, which is articulated to the turret with a first end thereof.
The boom lift comprises elements for supplying electrical power, at least for the movement of the machine, the rotation of the assembly and the actuation of the boom. Such elements comprise at least one first battery which is integrally supported by the machine and is arranged substantially below the element, and at least one second battery which is supported by the assembly and can rotate with respect to the machine integrally with this assembly. Such second battery is arranged substantially above the element.

9 Claims, 4 Drawing Sheets

(51) Int. Cl.
    *B60L 50/60*     (2019.01)
    *B60L 50/61*     (2019.01)
    *B60L 58/18*     (2019.01)
    *B66F 9/065*     (2006.01)
    *B66F 9/075*     (2006.01)
    *B60L 53/80*     (2019.01)

(52) U.S. Cl.
    CPC ............ *B60L 58/18* (2019.02); *B66F 9/0655* (2013.01); *B66F 9/07531* (2013.01); *B66F 9/07559* (2013.01); *B60L 53/80* (2019.02); *B60L 2200/40* (2013.01)

(56)     References Cited

OTHER PUBLICATIONS

Written Opinion dated Oct. 1, 2021 issued in PCT/EP2021/067403.
Italian Search Report and Written Opinion dated Jun. 7, 2021 issued in IT 202000023365, with partial translation.

\* cited by examiner

ROTARY TELESCOPIC BOOM LIFT

The present invention relates to a rotary telescopic boom lift.

As is known, a telescopic boom lift is a works vehicle that is widely used for a disparate range of industrial activities, in particular when interventions at considerable heights are required.

In more detail, according to a general arrangement that is now well-established, telescopic boom lifts are self-propelled systems that typically comprise a vehicle mounted on wheels or tracks, which supports a cab designed to accommodate an operator. The cab is thus articulated to a first end of a telescopic boom, which at the opposite end supports the tool adapted to carry out the activity of interest. Moreover, sometimes the tool is actually a platform designed to accommodate an operator, who is lifted to the desired height, where he or she can operate on infrastructure that is otherwise inaccessible.

In this context, an important subset of the category defined above is made up of rotating telescopic boom lifts, which have the peculiarity of having the cab mounted on a turret that can rotate, joined to the top of the vehicle by virtue of a rotary coupling.

Usually, in boom lifts of this type the primary energy source is constituted by an internal combustion engine, which powers one or more hydraulic systems which are responsible for the movement of the vehicle and of the rotation of the turret, and also for the actuation of the boom.

Up to now, attempts to replace internal combustion engines with electric motors (which as is known would ensure high performance levels and a drastic reduction in pollutant emissions) have come up short against the difficulties encountered by makers in finding a suitable placement for the batteries of storage units that are necessary to power the electric motors.

On the vehicle in fact, the available space is very limited, while if the batteries are arranged above the coupling, on the rotating turret, the need to ensure the transmission of power to the vehicle, for its propulsion, would require an oversize of the coupling that would be such as to render the solution impracticable, or in any case excessively expensive and structurally too complex.

The aim of the present invention is to solve the above mentioned problems, by providing a rotary telescopic boom lift that can be effectively powered with electrical power, but with a solution that is structurally simple and with limited space occupation.

Within this aim, an object of the invention is to provide a rotary telescopic boom lift that can be effectively powered with electrical power, without needing to oversize the rotary coupling responsible for the transmission of power.

Another object of the invention is to provide a rotary telescopic boom lift that avails of an effective electrical power supply system, while keeping dimensions and structural complexity comparable to (if not lower than) those of conventional solutions.

Another object of the invention is to provide a rotary telescopic boom lift that ensures a high reliability of operation.

Another object of the invention is to provide a rotary telescopic boom lift that adopts an alternative technical and structural architecture to that of conventional telescopic boom lifts.

Another object of the invention is to provide a rotary telescopic boom lift that can be easily implemented using elements and materials that are readily available on the market.

Another object of the invention is to provide a rotary telescopic boom lift that is of low cost and safely applied.

This aim and these and other objects which will become better apparent hereinafter are achieved by a rotary telescopic boom lift, comprising at least one self-propelled machine, which can move over ground and supports in an upper region a rotating assembly, associated with said machine by way of a rotary coupling element, said assembly comprising at least one turret and an operating boom, which is articulated to said turret with a first end thereof, characterized in that it comprises means for supplying electrical power, at least for the movement of said machine, the rotation of said assembly and the actuation of said boom, said means comprising: at least one first battery of high-energy storage units, such as drive batteries, which is integrally supported by said machine and is arranged substantially below said rotary coupling element and at least one second battery of high-energy storage units, such as drive batteries, which is supported by said assembly and can rotate with respect to said machine integrally with said assembly, said at least one second battery being arranged substantially above said rotary coupling element.

Further characteristics and advantages of the invention will become better apparent from the detailed description that follows of a preferred, but not exclusive, embodiment of the rotary telescopic boom lift according to the invention, which is illustrated by way of non-limiting example in the accompanying drawings wherein.

With particular reference to the figures, the reference numeral 1 generally designates a rotary telescopic boom lift, which comprises first of all at least one self-propelled machine 2, which can move over ground (be it the road surface, agricultural land, or any other resting surface where the boom lift 1 operates or over which it can in any case travel).

The machine 2 can be of the conventional type, it being therefore constituted by any model of vehicle that the person skilled in the art would consider adapted for the task; the machine 2 is therefore for example provided with wheels 3, tracks or the like, in order to allow movement over ground.

The machine 2 supports a rotating assembly in an upper region (above it), which is associated with the machine 2 by way of a rotary coupling element 4 (which allows the rotation of the assembly with respect to the machine 2, and to the ground, about a main axis A perpendicular to the ground): such rotating assembly comprises at least one turret 5 (typically provided with a cab 6 designed to accommodate an operator) and an operating boom 7.

Figure 1:
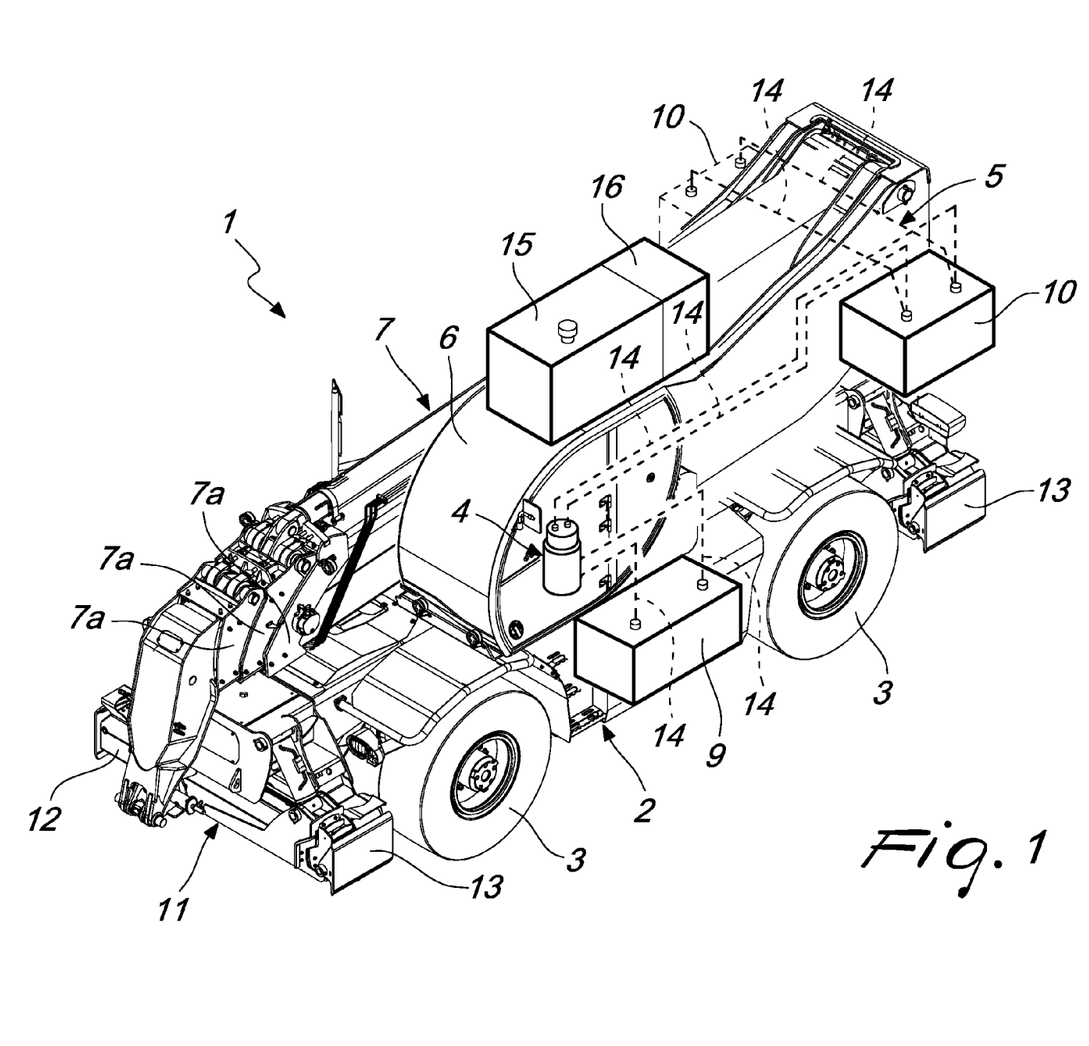
FIG. 1 is a schematic perspective view of the rotary telescopic boom lift according to the invention.
Figure 2:
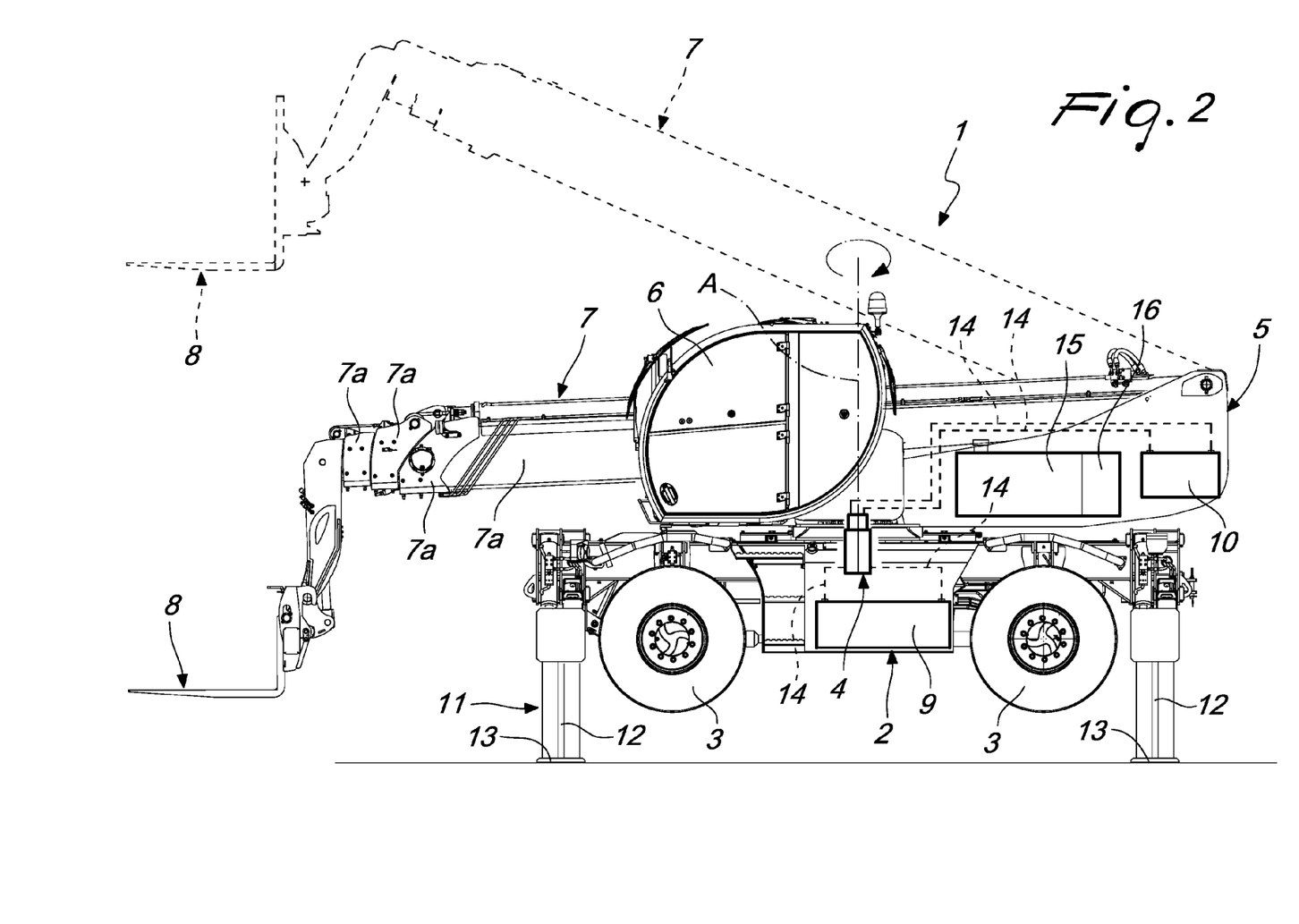
FIG. 2 is a schematic side view of the boom lift of FIG. 1, in a different configuration and with a second possible arrangement of the telescopic boom shown in dotted lines.

According to methods that are per se known, the telescopic boom 7 is articulated to the turret 5 with its own first end; at the opposite end, the boom 7 is adapted to support a work accessory or tool 8. The work tool 8 can be of any type (purely for the purposes of example, the accompanying figures show a tool 8 constituted by a form of fork), while remaining within the scope of protection claimed herein. In more detail, the tool 8 is preferably interchangeable and in any case may or may not be comprised in the boom lift 1 and sold or not sold together with the latter. In any case, the boom 7 is articulated to the turret 5 about a horizontal axis (parallel to the ground) in order to rotate from a configuration of minimum encumbrance in which the boom 7 is horizontal (FIG. 1 and FIG. 2, in the representation in solid lines) and so be able to lift the tool 8 to various heights (in FIG. 2, dotted lines show a possible rotated configuration of the boom 7).

It should be made clear from this point onward that typically (but not exclusively) the boom 7 is telescopic, therefore being constituted by two or more members 7a arranged in series, mutually slideable in pairs and extendable in order to be able to increase the lifting height of the accessory 8. However, the scope of protection claimed herein also includes the possibility that the rotating assembly comprises two or more booms 7, which are mutually articulated in pairs (with the accessory 8 supported by the last boom in the chain).

More generally, it should be noted that the implementation details relating to the machine 2, the turret 5 with the cab 6, the boom 7 and the corresponding members 7a, in addition to what is explained in the preceding and following paragraphs, can be conventional and the person skilled in the art can therefore choose in each instance the fitting-out and the form of implementation of the boom lift 1 deemed most suitable based on the common general knowledge of the sector and according to the specific requirements, while remaining within the scope of protection claimed herein.

According to the invention, the boom lift 1 comprises means for supplying electrical power, in order to provide the necessary energy at least for moving the machine 2 (in order to enable it to move over ground), for rotating the assembly (with respect to the machine 2) and for actuating the boom 7 (in order to enable it to rotate from the configuration of minimum encumbrance, and vice versa, and for the relative translation of the members 7a). More generally, the means are responsible for ensuring the energy necessary for the operation of the boom lift 1.

It should be noted that the electric power supply can be the only one available on the boom lift 1, just as the possibility is not ruled out of providing, in addition to the former, a power supply of another type (internal combustion for example), in the latter case making the boom lift 1 a hybrid system. Both possibilities should be understood as being comprised within the scope of protection claimed herein: the internal combustion (or in any case other type of) power supply can be chosen to be of the conventional type (but appropriate to the coexistence of the means for supplying electrical power) and therefore we will not explain it further in the discussion below.

The means for supplying electrical power comprise at least one first battery 9 of high-energy storage units, such as drive batteries (and preferably rechargeable), which is integrally supported by the machine 2 and is arranged substantially below the rotary coupling element 4 (on the ideal plane parallel to the ground which contains its center of gravity).

The means for supplying electrical power also comprise at least one second battery 10 of high-energy storage units, such as drive batteries (and preferably rechargeable), which is supported by the assembly (by the turret 5) and which can rotate with respect to the machine 2 integrally with that assembly. Such second battery 10 is arranged substantially above the rotary coupling element 4 (on the ideal plane parallel to the ground which contains its center of gravity).

So in fact the second battery 10 (integral with the turret 5) can move (it rotates) with respect to the first battery 9 (which is anchored to the machine 2).

The wording "high-energy" is used to emphasize that the first battery 9 and the second battery 10 are not of the type commonly used for supplying power to control devices, safety devices and/or auxiliary devices (such as for example buffer batteries and/or batteries that power control lines, telephone switchboards, displays, fans, safety elements, emergency electric pumps etc.), which can in any case in their turn be equipped on board the boom lift 1 (for example in order to perform the functions mentioned above). Precisely in order to clarify that the batteries 9, 10 are not comparable to the ones just mentioned, it is specified that they are "such as drive batteries", although, as will be clarified below, both of them will not necessarily be used for "driving" the boom lift 1.

In the context of the present invention (and of what is explained above), the first battery 9 and the second battery 10 can be chosen with a total stored energy exceeding 7 kWh.

It is further emphasized that, where in the present discussion reference is or will be made to above or below, vertical or horizontal elements, "high" and "low", such terms must be understood as referring to the various conditions of use of the boom lift 1, in which in any case, and evidently, the orientation of the latter is clearly determined and coincides with that assumed when the machine 2 rests on the ground.

It should be noted that the boom lift 1 can be provided with any desired number of first batteries 9 and second batteries 10 (according to the specific requirements and availability of space), while remaining within the scope of protection claimed herein. What is said and will be said below regarding the first battery 9, or the second, must or can refer to all the first batteries 9 or second batteries 10 installed on board the boom lift 1. It should be noted that in this regard the accompanying figures show a boom lift 1 provided with a first battery 9 and with two second batteries 10.

It should be noted moreover that what will be said below regarding the (each) first battery 9 and/or the (each) second battery 10 regards only such high-energy batteries (in the meaning explained in the foregoing pages) and not low-power batteries, designed for auxiliary systems, as indeed has just been clarified.

The distribution of energy by the batteries 9, 10 to the various systems of the boom lift 1 can be any, while remaining within the scope of protection: some specific practical possibilities in this sense will be explained below, which are of significant practical interest but which do not place any limitation on the scope of protection claimed herein.

In particular therefore, in an embodiment of significant practical interest, cited purely for the purposes of explaining the invention, the first battery 9 is configured at least to supply power to the drive unit of the machine 2, in order to enable its movement over ground. In such context, preferably, but not exclusively, the first battery 9 supplies electrical power to an electric motor that is responsible for the movement over ground of the machine 2. Preferably, the electric motor is also arranged below the element 4 and is supported integrally by the machine 2.

Furthermore, the second battery 10 is configured at least to supply electrical power to a system for moving the assembly and the boom 7, which (preferably but not exclusively) is chosen to be telescopic. In such context, the second battery 10 supplies power to the movement system in order to rotate the assembly with respect to the self-propelled machine 2, in order to rotate the boom 7 with respect to the turret 5 (as seen, about a horizontal axis) and in order to translate at least one member 7a of the boom 7, which as mentioned can slide with respect to another member 7a. If the boom 7 is not telescopic, then the movement system powered by the second battery 10 can handle, with regard to the boom 7, only the rotation of the boom 7 with respect to the turret 5. Furthermore, the second battery 10 is configured at least to supply electrical power to the steering system of the machine 2.

In such context, preferably, but not exclusively, the second battery 10 supplies electrical power to one or more electric pumps that actuate the above mentioned systems.

If there are several second batteries 10 (as in the accompanying examples), each one of them can be used for a specific system, one of the systems described above or other systems, and/or for a specific electric pump.

Figure 3:
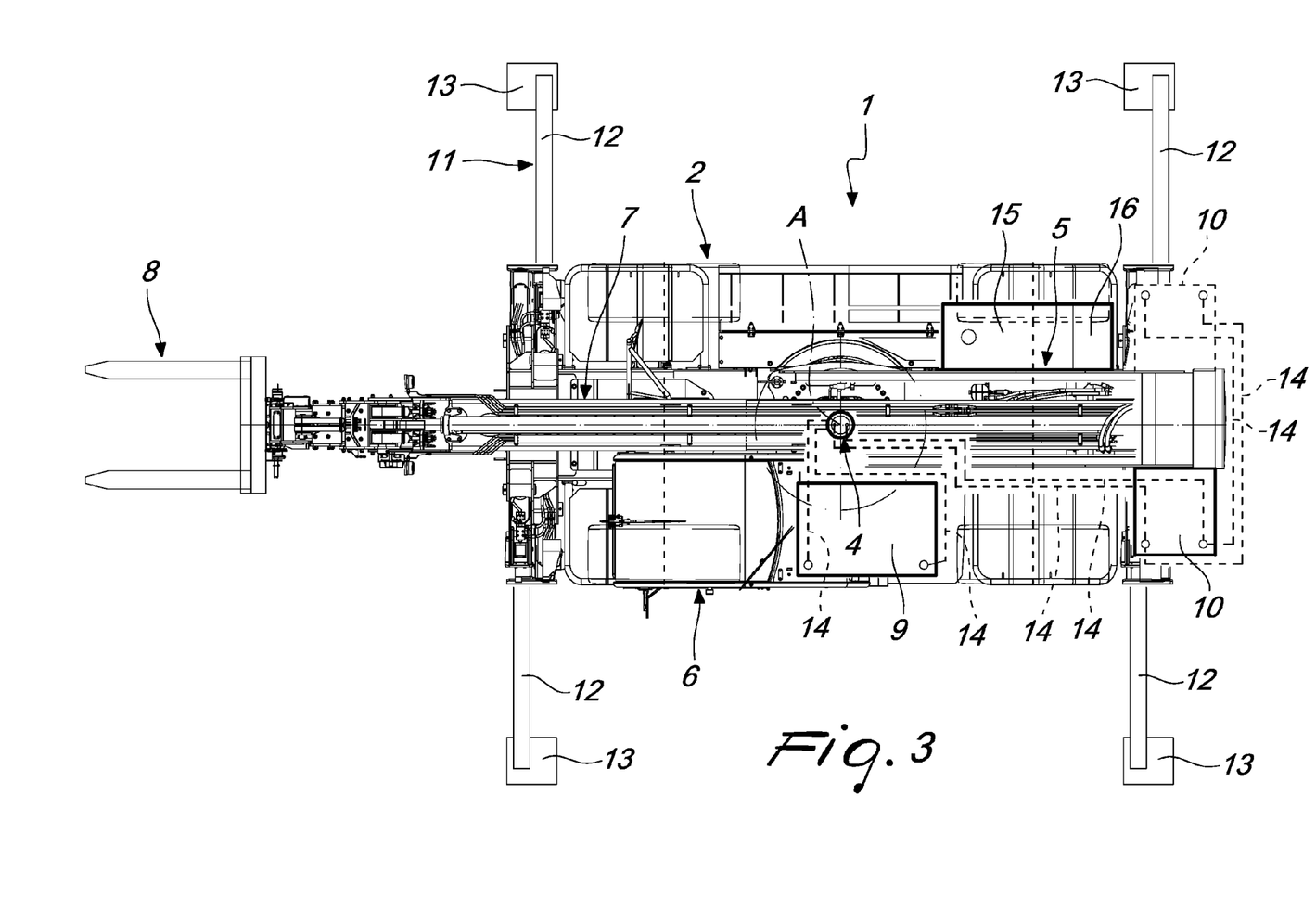
FIG. 3 is a schematic plan view of the boom lift of FIG. 1, in the configuration of FIG. 2.
Figure 4:
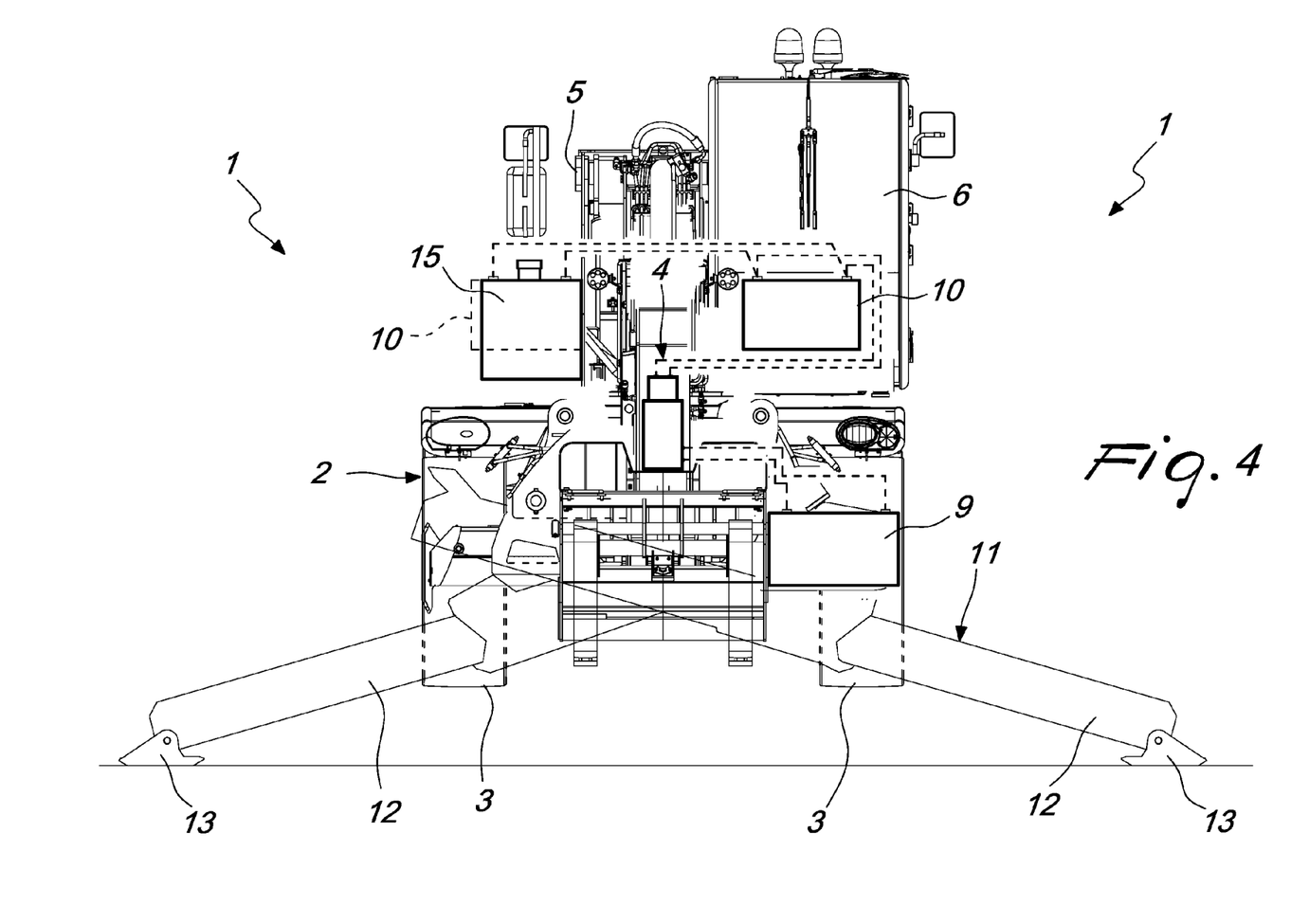
FIG. 4 is a schematic front elevation view of the boom lift of FIG. 1, in the configuration of FIG. 2.

Usefully, the boom lift 1 also comprises an apparatus 11 for stabilizing the machine 2 on the ground, which makes it possible to support heavy loads while firmly holding the position on the ground. The apparatus 11 can be conventional and, as in the accompanying figures, can comprise scissor stabilizers 12 which, from a configuration of minimum encumbrance (in which, as in FIG. 1, they are raised from the ground and allow the circulation of the machine 2 and therefore of the boom lift 1), open reversibly, in a scissor-like manner, to a configuration of maximum extension, in which as in FIGS. 2-4 they lift the machine 2 and the overlying rotating assembly off the ground, by resting themselves on the ground with feet 13, so as to widen the supporting base and ensure the desired stability.

Usefully, the second battery 10 is configured to supply electrical power to the apparatus 11 as well.

Advantageously, the first battery 9 and the second battery 10 are electrically connected, in order to allow the mutual flow of electrical power. This first of all makes it possible to recharge one of the two batteries 9, 10 using the other one, if for example a marked disparity arises in the respective charge levels, thus optimizing the duration of the supply of power (before needing to intervene with recharging operations). More simply, this peculiar choice makes it possible for one battery 9, 10 to transfer power to the other in order to cooperate with it in powering one or more systems/utilities for which it is designated.

Conveniently, the boom lift 1 comprises at least one electronic control and management unit for the batteries 9, 10, which is provided at least with a programmable module for adjusting the rate of flow of electrical power between these batteries 9, 10.

Preferably this module can be controlled via a dedicated interface by a user, who can thus (for example) choose whether and how to manage the exchange of power between the batteries 9, 10 (including inhibiting it) and therefore also the levels of charge of each one of them.

The electronic unit can be of any type, and preferably it is constituted by an electronic controller. The possibility is not ruled out however of using different types of electronic unit, which could therefore be any hardware platform, reprogrammable or otherwise, that is capable of acting according to the methods described here (automatically and/or as a consequence of user intervention).

More specifically, the electronic unit also comprises a programmable module for the instant-by-instant management of profiles for electrical power supply by each battery 9, 10.

So by taking advantage of the fact that the batteries 9, 10 are mutually connected, one can choose to discharge one battery 9, 10 more than the other, assigning for example to one of them the task of transferring some of its power to the other one, in order to assist it in the supply of power to the utilities for which the latter battery is designated.

More generally, it should be noted that the presence of the electronic unit and/or the choice to electrically connect the batteries 9, 10 offers many and varied possibilities for managing the electric power supply of the various systems connected to the batteries 9, 10.

So if typically it is arranged that each system is powered at least predominantly by the battery 9, 10 that is physically closest to it, the invention effectively makes it possible at any time for one battery 9, 10 to assist another, according to the specific requirements.

It should be noted that in the accompanying figures the various circuit branches 14 that connect the terminals of the various batteries 9, 10 to each other are shown in dotted lines.

Moreover, the figures show that preferably all the branches 14 converge on the electrical connection element 4, which preferably is a rotating electric commutator that is chosen to be capable of ensuring the continuous transmission not only of power, but also of electrical signals and, preferably, also of the hydraulic systems necessary to the operation of the boom lift 1.

Conveniently, the boom lift 1 comprises a common charging node, which is arranged in connection with each battery 9, 10 by way of a respective electrical circuit and can be connected to a common charging device. In this context, typically, the batteries 9, 10 are connected via portions in parallel to the common node.

The possibility of using a single recharging device has considerable importance, in that it does not appreciably increase the space occupation and the complexity of the boom lift 1.

It should be noted that in a first possible embodiment the recharging device can consist of (or comprise) an apparatus capable of receiving the power supplied by the mains electricity supply, converting alternating current to direct current, with the latter being adapted to supply power to the batteries 9, 10. In any case, the common recharging device may or may not be fitted on the boom lift 1.

In particular, in an embodiment of significant practical interest, the common recharging device comprises (or is constituted by) an internal combustion engine for recharging, which is supported integrally by the machine 2 and (preferably but not exclusively) is arranged substantially below the rotary coupling element 4. The internal combustion engine can in any case also be kept on the ground, and therefore not mounted directly on the boom lift 1.

It is emphasized however that the possibility exists of entrusting the recharging of the batteries 9, 10 to other implementation solutions.

Conveniently, in the preferred embodiment the batteries 9, 10 are of the "plug and play" type, thus ensuring greater ease of installation and maintenance.

Operation of the boom lift according to the invention is therefore as follows.

According to methods that are per se known, the machine 2 can be moved over ground in order to be brought to the site and to the exact point where it is necessary to carry out an operation (usually at a given height from the ground), for which the use of the boom lift 1 (with the tool 8 fitted on the boom 7) is indeed required. In more detail, after having reached the point of intervention it is possible to activate the apparatus 11, in order to obtain a more stable hold on the ground, and then rotate the turret 5 and/or move the boom 7, in order to carry out the desired work.

What characterizes the invention is therefore first of all the choice to use (exclusively or otherwise) an electric power supply of the various systems that ensure the operation of the boom lift 1 and the movement of its functional subassemblies, in that this makes it possible to reduce consumption, noise pollution and emissions in general, while at the same time obtaining better operating conditions and higher performance. The completely peculiar choice to arrange high-energy batteries 9, 10 (i.e. responsible for supplying power) partially above and partially below the element 4, in such a way therefore that they are integrally supported partially by the turret 5 (or in any case by the rotating assembly) and partially by the machine 2, in fact makes it possible to achieve the set aim.

In fact, this choice makes it possible to take advantage of the reduced spaces available, which are typically distributed unevenly along the entire boom lift 1 and which do not allow the possibility to arrange in the same position (above or below the element 4) all the storage units necessary to supply power to the principal systems of the boom lift 1 proper.

This makes it possible to provide a rotary telescopic boom lift 1 that can be effectively powered with electrical power, but with a solution that is structurally simple and with contained space occupation.

Furthermore, since at least one first battery 9 can be arranged below the element 4, together with the electric motor that supplies power for motive force, there is no need to oversize said element 4, as would be necessary if power were to be supplied only and exclusively using storage units arranged above.

The rotary telescopic boom lift 1 therefore keeps dimensions and structural complexity comparable to (if not lower than) those of conventional solutions.

It should further be noted that thanks to the choice to use means for supplying electrical power, which can be effectively distributed along the entire boom lift 1, in the invention spaces are "freed up" which in conventional solutions are traditionally occupied by other systems, thus making it possible to distribute other instruments and accessories more efficaciously and rationally.

It is in this context that the choice was made to place the oil tank 15 and the services compartment 16 above the element 4, supporting them with the turret 5 (for example in the two different configurations shown in the figures).

Once again the usefulness is emphasized of electrically connecting the batteries 9, 10 and of installing an electronic unit onboard for controlling them and managing them: as seen in fact, this makes it possible to choose at will the electrical power supply profiles and/or the operating regimes of each battery 9, 10, by moving power as needed from one to the other in order to cooperate in supplying power to the utilities.

The use of a conventional recharging device in turn contributes to keeping weights, encumbrances and costs contained.

The invention, thus conceived, is susceptible of numerous modifications and variations, all of which are within the scope of the appended claims. Moreover, all the details may be substituted by other, technically equivalent elements.

In the embodiments illustrated, individual characteristics shown in relation to specific examples may in reality be substituted with other, different characteristics, existing in other embodiments.

In practice, the materials employed, as well as the dimensions, may be any according to requirements and to the state of the art.

The disclosures in Italian Patent Application No. 102020000023365 from which this application claims priority are incorporated herein by reference.

The invention claimed is:

1. A rotary telescopic boom lift, comprising at least one self-propelled machine, which can move over ground and supports in an upper region a rotating assembly, associated with said machine by way of a rotary coupling element, said assembly comprising at least one turret and an operating boom, which is articulated to said turret with a first end thereof, and further comprising means for supplying electrical power, at least for a movement of said machine, a rotation of said assembly and an actuation of said boom, said means comprising:
   at least one first battery of high-energy storage units, such as drive batteries, which is integrally supported by said machine and is arranged substantially below said rotary coupling element,
   at least one second battery of high-energy storage units, such as drive batteries, which is supported by said assembly and is configured to rotate with respect to said machine integrally with said assembly, said at least one second battery being arranged substantially above said rotary coupling element, said at least one first battery and said at least one second battery being electrically connected, for a mutual flow of electrical power.

2. The rotary telescopic boom lift according to claim 1, wherein said at least one first battery is configured at least to supply power to a drive unit of said machine, for the movement of said machine over ground.

3. The rotary telescopic boom lift according to claim 1, wherein said at least one second battery is configured at least to supply electrical power to a system for moving said assembly and said boom, chosen to be telescopic, for the rotation of said assembly with respect to said machine, for a rotation of said boom with respect to said turret and for a translation of at least one member of said boom, which can slide with respect to another member of said boom, said at least one second battery being further configured at least to supply electrical power to the steering system of said machine.

4. The telescopic boom lift according to claim 1, further comprising an apparatus for stabilizing said machine on the ground, said at least one second battery of storage units being configured to supply electrical power to said apparatus.

5. The telescopic boom lift according to claim 1, further comprising at least one electronic control and management unit for said batteries which is provided at least with a programmable module for adjusting a rate of flow of electrical power between said first and second batteries.

6. The telescopic boom lift according to claim 1, wherein said electronic unit comprises a programmable module for an instant-by-instant management of profiles for electrical power supply by each one of said first and second batteries.

7. The rotary telescopic boom lift according to claim 1, further comprising a common charging node, which is arranged in connection with each one of said first and second batteries by way of a respective electrical circuit and can be connected to a common charging device.

8. The rotary telescopic boom lift according to claim 7, characterized in that said common charging device comprises an internal combustion engine for charging, which is supported integrally by said machine and is arranged substantially below said rotary coupling element.

9. The telescopic boom lift according to claim 1, wherein said first and second batteries are of the plug and play type.

* * * * *